No. 778,725. Patented December 27, 1904.

UNITED STATES PATENT OFFICE.

DANIEL VORLÄNDER AND BRUNO DRESCHER, OF HALLE-ON-THE-SAALE, AND PAUL SEIDEL, OF LUDWIGSHAFEN-ON-THE-RHINE, GERMANY, ASSIGNORS TO BADISCHE ANILIN AND SODA FABRIK, OF LUDWIGSHAFEN-ON-THE-RHINE, GERMANY, A CORPORATION.

ACYLATED INDOXYL AND PROCESS OF MAKING SAME.

SPECIFICATION forming part of Letters Patent No. 778,725, dated December 27, 1904.

Application filed June 4, 1901. Serial No. 63,142. (Specimens.)

*To all whom it may concern:*

Be it known that we, DANIEL VORLÄNDER, private tutor, a subject of the King of Prussia, Emperor of Germany, and BRUNO DRESCHER, student of chemistry, a subject of the Duke of Altenburg, both residing at Halle-on-the-Saale, and PAUL SEIDEL, doctor of philosophy and chemist, a subject of the King of Saxony, residing at Ludwigshafen-on-the-Rhine, in the Kingdom of Bavaria, Germany, have invented new and useful Improvements in Acylated Indoxyl and Processes of Producing Same, of which the following is a specification.

We have discovered that valuable monoacylated compounds of indoxylic acid and indoxyl can be obtained by causing a moderate reaction to take place between indoxyl and indoxylic acid or salts thereof and, on the other hand, acetic anhydrid, acetyl chlorid, benzoyl chlorid, or similar acid derivatives, all of which are hereinafter included in the expression "organic-acid derivative." As indoxylic acid readily changes into indoxyl, emitting carbonic-acid gas, it usually happens that upon acylating indoxylic acid the acyl derivatives of indoxylic acid and indoxyl are obtained in one operation. According to the nature of the initial material used and from the method of working, the acyl compounds of indoxylic acid or of indoxyl can be obtained as the principal or sole product. What we wish to claim in this application are the hereinbefore-defined acyl derivatives of indoxyl and the process of producing same, while the acyl derivatives of indoxylic acid are claimed in the specification, Serial No. 63,143, filed June 4, 1901.

The following examples will serve to further illustrate the nature of our invention and a method of carrying it into practical effect; but our invention is not confined to the examples. The parts are by weight.

*Example 1—Production of a mixture of monoacet-indoxyl and monoacet-indoxylic acid.*—Prepare a melt containing indoxyl and indoxylic acid, obtained, say, from one (1) part of phenyl-glycocoll-ortho-carboxylic acid (alkali salt) and three (3) parts of potassium hydroxid in the manner described in the specification of Letters Patent No. 546,165 of 1895. Dissolve five (5) parts of such a melt in an equal quantity of water and neutralize the excess of potash with concentrated acetic acid and then add one (1) part of acetic anhydrid and agitate the mixture. A crystalline precipitate consisting of acet-indoxyl and acet-indoxylic acid (potassium salt) separates out. To separate these compounds, grind the precipitate repeatedly with ice-cold water. The acet-indoxyl remains undissolved. The monoacet-indoxyl thus obtained and which we wish to claim specifically can be recrystallized from water containing a little alcohol and is obtained in leaflets. It melts at a temperature of one hundred and twenty-five (125) to one hundred and twenty-six (126) degrees centigrade. It, as also the other monoacyl indoxyl bodies, such as propionyl-indoxyl and benzoyl-indoxyl, are readily soluble in alcohol, ether, glacial acetic acid, benzene, and chloroform. They are not dissolved by cold caustic-alkali solution; but upon standing with caustic-alkali or carbonate-of-soda solution they are decomposed. The alcoholic solutions do not give a color reaction with ferric chlorid. If their glacial-acetic-acid solutions be warmed with a little concentrated nitric acid or with bromin-water, a violet-red color is obtained. On heating with caustic soda and subsequent treatment with air they yield indigo. The potassium salt of the acet-indoxyl acid contained in the filtrate from the acet-indoxyl can be collected by salting out.

*Example 2—Production of monoacet-indoxyl.*—The acet-indoxyl, insoluble in alkali, can readily be obtained free from acet-indoxylic acid if the alkali solution of the mixture of the salts of indoxylic acid and indoxyl be boiled in their alkaline solutions before acetylization. The indoxylic acid loses its carbonic acid and the resulting solution contains indoxyl only. For instance, dissolve five (5) parts of a melt containing indoxylic acid and indoxyl, such as be can be obtained as described in the specification of Letters Patent No. 546,165 of 1895, in fifty (50) parts of boiling water. Allow the solution to stand for about a quarter ($\frac{1}{4}$) of an hour. The indoxylic acid present is converted to indoxyl. Cool the mixture and when cold add forty (40) parts of ice and three and a half ($3\frac{1}{2}$) parts of sulfuric acid,(containing about fifty per cent. of $H_2SO_4$.) Stir well and add about one and a half ($1\frac{1}{2}$) parts of acetic anhydrid. The liquid should finally possess a neutral reaction. The acet-indoxyl soon separates out in the crystalline form and can be collected by filtering. In a similar manner other acyl derivatives of indoxylic acid and of indoxyl—for instance, the propionyl or the benzoyl derivatives—can be obtained.

Now what we claim is—

1. The process of producing monoacyl-indoxyl which consists in causing a moderate reaction to take place between indoxyl and a hereinbefore-defined organic-acid derivative, substantially as described.

2. The process of producing monoacet-indoxyl by causing a moderate reaction to take place between indoxyl and acetic anhydrid, substantially as described.

3. As a new body monoacyl-indoxyl which can be obtained substantially as hereinbefore described; which is soluble in alcohol and ether and is not dissolved by cold dilute caustic-soda solution while excluding oxygen; which does not give a color reaction with ferric chlorid; and which when heated with caustic soda and subsequently treated with air yields indigo, substantially as described.

4. As a new body monoacet-indoxyl which can be obtained in crystalline form, melting at about one hundred and twenty-five (125) to one hundred and twenty-six (126) degrees centigrade; which is soluble in alcohol and ether but insoluble in cold dilute caustic-soda solution while excluding oxygen; which does not give a color reaction with ferric chlorid; and which on being heated with caustic soda and subsequently treated with atmospheric air yields indigo, substantially as described.

In testimony whereof we have hereunto set our hands in the presence of two subscribing witnesses.

DANIEL VORLÄNDER.
BRUNO DRESCHER.
PAUL SEIDEL.

Witnesses to the signatures of the said Daniel Vorländer and Bruno Drescher:
    RUDOLPH FRICKE,
    B. W. WARNER, Jr.

Witnesses to the signature of the said Paul Seidel:
    JOHN L. HEINKE,
    PERCY J. JONES.